(12) United States Patent
Tanaka et al.

(10) Patent No.: US 9,919,267 B2
(45) Date of Patent: Mar. 20, 2018

(54) GAS-LIQUID CONTACTOR AND CO₂ RECOVERY DEVICE

(71) Applicant: MITSUBISHI HEAVY INDUSTRIES, LTD., Tokyo (JP)

(72) Inventors: Hiroshi Tanaka, Tokyo (JP); Hiromitsu Nagayasu, Tokyo (JP); Takuya Hirata, Tokyo (JP); Atsuhiro Yukumoto, Tokyo (JP); Tsuyoshi Oishi, Tokyo (JP); Yoshinori Kajiya, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 51 days.

(21) Appl. No.: 15/102,141

(22) PCT Filed: Jan. 13, 2015

(86) PCT No.: PCT/JP2015/050662
§ 371 (c)(1),
(2) Date: Jun. 6, 2016

(87) PCT Pub. No.: WO2015/111463
PCT Pub. Date: Jul. 30, 2015

(65) Prior Publication Data
US 2016/0310894 A1 Oct. 27, 2016

(30) Foreign Application Priority Data

Jan. 27, 2014 (JP) .................................. 2014-012720

(51) Int. Cl.
*B01D 53/14* (2006.01)
*B01D 53/62* (2006.01)
(Continued)

(52) U.S. Cl.
CPC ......... *B01D 53/78* (2013.01); *B01D 53/1425* (2013.01); *B01D 53/1475* (2013.01);
(Continued)

(58) Field of Classification Search
CPC ........ B01D 2252/204; B01D 2257/504; B01D 2258/0283; B01D 53/1425;
(Continued)

(56) References Cited

U.S. PATENT DOCUMENTS 4,501,707 A 2/1985 Buhlmann
4,557,877 A 12/1985 Hofstetter
(Continued)

FOREIGN PATENT DOCUMENTS

EP 0 130 745 A2 1/1985
EP 0454179 A1 * 10/1991 .............. B01J 19/32
(Continued)

OTHER PUBLICATIONS

International Search Report dated Apr. 7, 2015, issued in counterpart of International application No. PCT/JP2015/050662 with English translation(6 pages).
(Continued)

*Primary Examiner* — Cabrena Holecek
(74) *Attorney, Agent, or Firm* — Westerman, Hattori, Daniels & Adrian, LLP

(57) ABSTRACT

A gas-liquid contactor includes: a plurality of packing material sections through which exhaust gas passes; and a plurality of liquid distributors provided upon each of the plurality of packing material sections, dispersing a CO₂ absorption liquid caused to come in contact with the exhaust gas, and supplying the CO₂ absorption liquid to the plurality of packing material sections. The plurality of packing material sections include a first packing material layer and a second packing material layer that have provided therein (Continued)

flow paths (111a, 112a) for the $CO_2$ absorption fluid that each extend in prescribed directions (D2, D3). The first packing material layer and the second packing material layer are characterized by being laminated such that the directions (D2, D3) of extension of the flow paths (111a, 112a) in the flow direction (D1) for the exhaust gas are different from each other.

7 Claims, 6 Drawing Sheets

(51) Int. Cl.
  *B01D 53/78* (2006.01)
  *B01J 19/32* (2006.01)
  *C01B 31/20* (2006.01)
  *B01D 53/18* (2006.01)

(52) U.S. Cl.
  CPC ....... *B01D 53/1493* (2013.01); *B01D 53/185* (2013.01); *B01D 53/62* (2013.01); *B01J 19/32* (2013.01); *C01B 31/20* (2013.01); *B01D 2252/204* (2013.01); *B01D 2257/504* (2013.01); *B01D 2258/0283* (2013.01); *B01J 2219/3221* (2013.01); *B01J 2219/3222* (2013.01); *B01J 2219/32206* (2013.01); *B01J 2219/32217* (2013.01); *B01J 2219/32227* (2013.01); *B01J 2219/32234* (2013.01); *B01J 2219/32268* (2013.01); *B01J 2219/32272* (2013.01); *B01J 2219/3325* (2013.01); *Y02C 10/04* (2013.01); *Y02C 10/06* (2013.01); *Y02P 20/152* (2015.11)

(58) Field of Classification Search
  CPC ............ B01D 53/1475; B01D 53/1493; B01D 53/185; B01D 53/62; B01D 53/78; B01J 19/32; B01J 2219/32206; B01J 2219/3221; B01J 2219/32217; B01J 2219/3222; B01J 2219/32227; B01J 2219/32234; B01J 2219/32268; B01J 2219/32272; B01J 2219/3325; C01B 31/20; Y02C 10/04; Y02C 10/06; Y02P 20/152
  See application file for complete search history.

(56) References Cited

U.S. PATENT DOCUMENTS

| | | | |
|---|---|---|---|
| 5,486,318 A | | 1/1996 | McKeigue et al. |
| 5,725,810 A | * | 3/1998 | Brunner ................ B01D 3/008 261/112.1 |
| 2009/0098035 A1 | * | 4/2009 | Burkhardt .......... B01D 53/1425 423/224 |

FOREIGN PATENT DOCUMENTS

| | | |
|---|---|---|
| JP | 41-11327 A | 6/1966 |
| JP | 41-11327 B1 | 6/1966 |
| JP | 49-125604 A | 12/1974 |
| JP | 50-95439 U | 7/1975 |
| JP | 51-126970 A | 11/1976 |
| JP | 52-17369 A | 2/1977 |
| JP | 53-26352 U | 3/1978 |
| JP | 56-24029 A | 3/1981 |
| JP | 59-127601 A | 7/1984 |
| JP | 4-57251 U | 5/1992 |
| JP | 6-269629 A | 9/1994 |
| JP | H06-285357 A | 10/1994 |
| JP | 8-276101 A | 10/1996 |
| JP | 9-290148 A | 11/1997 |
| JP | 2003-517919 A | 6/2003 |
| JP | 2012-232292 A | 11/2012 |
| WO | 2007/068695 A1 | 6/2007 |

OTHER PUBLICATIONS

Written Opinion dated Apr. 7, 2015, issued in counterpart of International application No. PCT/JP2015/050662 (4 pages).
Office Action dated Jun. 27, 2017, issued in counterpart Japanese Application No. 2014-012720, with machine translation. (7 pages).
Extended (supplementary) European Search Report dated Jan. 9, 2017, issued in counterpart European Application No. 15740340.3. (8 pages).
English Translation of Written Opinion dated Apr. 7, 2015, issued in counterpart of International Application No. PCT/JP2015/050662. (5 pages).
Office Action dated Sep. 5, 2017, issued in counterpart Japanese Application No. 2014-012720, with English translation (10 pages).

* cited by examiner

GAS-LIQUID CONTACTOR AND $CO_2$ RECOVERY DEVICE

TECHNICAL FIELD

The present invention relates to a gas-liquid contactor, and a $CO_2$ recovery device that perform absorption and distillation by gas-liquid contact using a treatment liquid, and particularly to a gas-liquid contactor and a $CO_2$ recovery device, using a packing material.

BACKGROUND ART

In the related art, gas-liquid contactors, which bring a $CO_2$ absorption liquid into contact with $CO_2$ contained in an exhaust gas exhausted from a boiler of a thermoelectric power plant, thereby reducing $CO_2$ contained in the exhaust gas, are suggested (for example, refer to PTL 1). In the gas-liquid contactors, the recovery rate of $CO_2$ contained in the exhaust gas is improved by spraying the $CO_2$ absorption liquid from above the packing material that fills the inside of the device, thereby improving the contact area between the $CO_2$ absorption liquid flowing down along the surface of the packing material and the exhaust gas flowing through the packing material.

CITATION LIST

Patent Literature

[PTL 1] Japanese Unexamined Patent Application Publication No. 6-269629

SUMMARY OF INVENTION

Technical Problem

Meanwhile, in the related-art gas-liquid contactors, gas-liquid maldistribution within the gas-liquid contactors may become large with an increase in size of the devices, the absorption performance of $CO_2$ may degrade, and sufficient absorption performance of $CO_2$ may not be obtained merely by filling the insides of the gas-liquid contactors with the packing material.

The invention has been made in view of such actual circumstances, and an object thereof is to provide a gas-liquid contactor and a $CO_2$ recovery device capable of reducing gas-liquid maldistribution inside a device to prevent reduction in gas absorption performance even if the overall device has increased in size.

Solution to Problem

A gas-liquid contactor of the invention includes a plurality of packing material sections through which a gas to be treated passes; and a plurality of liquid distributors that are respectively provided on the plurality of packing material sections, disperse a liquid brought into contact with the gas to be treated, and supply the liquid to the plurality of packing material sections. The plurality of packing material sections include a first packing material layer and a second packing material layer that have flowpaths for the fluid provided to extend in predetermined directions, respectively, and the first packing material layer and the second packing material layer are laminated such that the extending directions of the flowpaths in a flow direction of the gas to be treated are different from each other.

According to this gas-liquid contactor, the liquid dispersed by the liquid distributors that are respectively provided in the plurality of packing material sections is supplied. Thus, liquid maldistribution in the liquid distributors can foe prevented even in a case where the overall device has increased in size. Additionally, in the gas-liquid contactor, the first packing material layer and the second packing material layer are laminated such that the extending directions, of the flowpaths for the liquid dispersed by the liquid distributors are different from each other. Thus, gas-liquid, maldistribution within the plurality of packing material sections can be prevented. Moreover, since the plurality of packing material sections are provided within the gas-liquid contactor, an increase in gas-liquid maldistribution to the packing material sections adjacent to each other can be prevented. Therefore, in the gas-liquid contactor, it is possible to realize the gas-liquid contactor that can reduce gas-liquid maldistribution within the device to prevent degradation in gas absorption performance, in a case where the overall device has increased in size.

In the gas-liquid contactor according of the invention, it is preferable that the first packing material layer and the second packing material layer are laminated such that the extending directions of the flowpaths are substantially orthogonal to each other. By virtue of this configuration, in the gas-liquid contactor, the dispersibility of the liquid within the first packing material layer and the second packing material layer is improved. Thus, gas-liquid maldistribution within the plurality of packing material sections can be prevented.

In the gas-liquid contactor according of the invention, it is preferable that the first packing material layer and the second packing material layer are provided such that the flowpaths are oblique with respect to the flow direction of the gas to be treated. By virtue of this configuration, in the gas-liquid contactor, the residence time of the liquid within the first packing material layer and the second packing material layer becomes long, and the dispersibility of the liquid is improved. Thus, gas-liquid maldistribution within the plurality of packing material layers can be prevented further.

In the gas-liquid contactor of the invention, it is preferable that the first packing material layer and the second packing material layer are plate-like packing materials. By virtue of this configuration, in the gas-liquid contactor, the dispersibility of the liquid within the first packing material layer and the second packing material layer is improved. Thus, gas-liquid maldistribution within the plurality of packing material sections can be prevented.

In the gas-liquid contactor of the invention, it is preferable that the shape of the plate-like packing materials is a corrugated plate-like shape or a flat plate-like shape. By virtue of this configuration, in the gas-liquid contactor, the dispersibility of the liquid within the first packing material layer and the second packing material layer is improved. Thus, gas-liquid maldistribution within the plurality of packing material layers can be prevented.

In the gas-liquid contactor of the invention, it is preferable to further include a partitioning member that is provided between the plurality of packing material sections and partitions off the plurality of packing material sections from each other. By virtue of this configuration, in the gas-liquid contactor, the plurality of packing material sections are divided by the partitioning members. Thus, an increase in gas-liquid maldistribution to the packing material layers adjacent to each other can be prevented further.

A CO$_2$ recovery device of the invention includes the above gas-liquid contactor; a CO$_2$ absorption tower that brings an exhaust gas including CO$_2$ into contact with a CO$_2$ absorption liquid absorbing CO$_2$, and removes CO$_2$ from the exhaust gas; and a regeneration tower that releases CO$_2$ from the CO$_2$ absorption liquid that has absorbed CO$_2$, and regenerates the CO$_2$ absorption liquid.

According to this CO$_2$ recovery device, the CO$_2$ absorption liquid, which is dispersed by the liquid distributors that are respectively provided in the plurality of packing material sections, is supplied. Thus, liquid maldistribution of the CO$_2$ absorption liquid in the liquid distributors can be prevented even in a case where the overall device has increased in size. Additionally, in the CO$_2$ recovery device, the first packing material layer and the second packing material layer are laminated such that the extending directions of the flowpaths for the CO$_2$ absorption liquid dispersed by the liquid distributors are different from each other. Thus, gas-liquid maldistribution within the plurality of packing material sections can be prevented. Moreover, since the plurality of packing material sections are provided within the CO$_2$ recovery device, an increase in gas-liquid maldistribution to the packing material sections adjacent to each other can be prevented. Therefore, in the CO$_2$ recovery device, it is possible to realize the CO$_2$ recovery device that can reduce gas-liquid maldistribution within the device and can prevent degradation in gas absorption performance, in a case where the overall device has increased in size.

Advantageous Effects of Invention

According to the invention, it is possible to realize the gas-liquid contactor and the CO$_2$ recovery device capable of reducing gas-liquid maldistribution inside the device to prevent reduction in gas absorption performance even if the overall device has increased in size.

DESCRIPTION OF EMBODIMENTS

Hereinafter, embodiments of the invention will be described in detail with reference to the accompanying drawings. In addition, although an example in which the invention is applied to a CO$_2$ recovery device will be described below, the invention is applicable to various gas-liquid contactors other than the CO$_2$ recovery device. Additionally, in the invention, the configurations of CO$_2$ recovery devices related to the following respective embodiments can be appropriately combined and implemented. In addition, the invention is not limited to the following embodiments, can be appropriately changed and implemented.

First Embodiment

Figure 1:
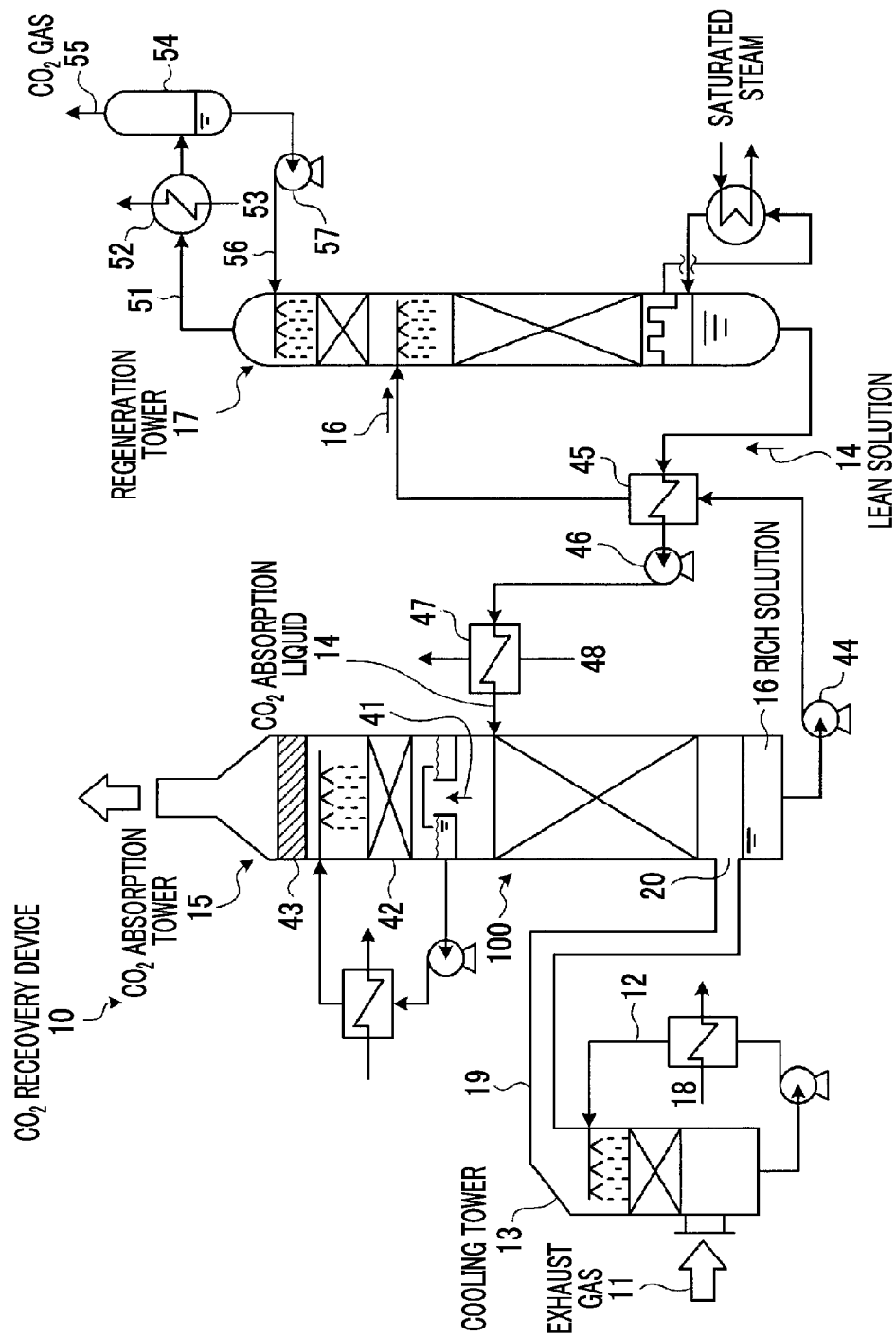
FIG. 1 is a schematic view of a CO$_2$ recovery device including a gas-liquid contactor related to a first embodiment.

FIG. 1 is a schematic view of a CO$_2$ recovery device including a gas-liquid contactor related to a first embodiment of the invention. As illustrated in FIG. 1, the CO$_2$ recovery device 10 is a device that recovers CO$_2$ in an exhaust gas 11 containing CO$_2$ exhausted from industrial facilities, such as a boiler and a gas turbine and exhausts a high-concentration CO$_2$ gas 55. The CO$_2$ recovery device 10 includes a cooling tower 13 into which the exhaust gas 11 containing CO$_2$ is introduced, a CO$_2$ absorption tower 15 that is provided in a subsequent stage of the cooling tower 13, and a regeneration tower 17 that is provided in a subsequent stage of the CO$_2$ absorption tower 15.

The cooling tower 13 cools the exhaust gas 11 containing CO$_2$ with water 12. The CO$_2$ absorption tower 15 brings the exhaust gas 11 cooled in the cooling tower 13 into contact with a CO$_2$ absorption liquid 14 that absorbs CO$_2$, and removes CO$_2$ from the exhaust gas 11. The regeneration tower 17 heats the CO$_2$ absorption liquid (rich solution) 16 that has absorbed CO$_2$ in the CO$_2$ absorption tower 15, releases CO$_2$ from the CO$_2$ absorption liquid 16, and regenerates the CO$_2$ absorption liquid 14.

In the CO$_2$ recovery device 10, the CO$_2$ absorption liquid 14 circulates between the CO$_2$ absorption tower 15 and the regeneration towers 17. The CO$_2$ absorption liquid 14 (lean solution) is supplied to the regeneration tower 17 as the CO$_2$ absorption liquid (rich solution) 16 that has absorbed CO$_2$ in the CO$_2$ absorption tower 15. Additionally, the CO$_2$ absorption liquid (rich solution) 16 is supplied to the CO$_2$ absorption tower 15 as the CO$_2$ absorption liquid (lean solution) 14 from which almost all CO$_2$ has been removed, and regenerated in the regeneration tower 17.

The exhaust gas 11 containing CO$_2$ is sent to the cooling tower 13 after the pressure thereof is raised by an exhaust-gas blower or the like, and is cooled by coming into countercurrent contact with the water 12 within the cooling tower 13. The water 12 that performs heat exchange with the exhaust gas 11 and has a high temperature is cooled by cooling water 18 and is circulated and used as cooling water for the exhaust gas 11, after being extracted from a bottom part of the cooling tower 13. The cooled exhaust gas 11 is exhausted to a flue 19 that is provided between the cooling tower 13 and the CO$_2$ absorption tower 15. The exhaust gas 11 exhausted from the cooling tower 13 is sent from a supply port 20 provided in a side wall of a tower bottom part of the CO$_2$ absorption tower 15 via the flue 19 to the CO$_2$ absorption tower 15.

The CO$_2$ absorption tower 15 has a gas-liquid contactor 100, which brings the CO$_2$ absorption liquid 14 (for example, a basic amine compound) and the exhaust gas 11 into countercurrent contact with each other, provided on a lower side thereof. The interior of the gas-liquid contactor 100 is filled with a packing material section 110 (not illustrated in FIG. 1, refer to FIG. 2), and an upper part of the packing material section 110 is provided with a liquid distributor 120 (not illustrated in FIG. 1, refer to FIG. 2 and the like) to which the CO$_2$ absorption liquid 14 is supplied. In the CO$_2$ absorption tower 15, when the exhaust gas 11 passes to rises from the lower side of the CO$_2$ absorption tower 15, the CO$_2$ absorption liquid 14 is supplied from an upper part, and the rising exhaust gas 11 and the CO$_2$ absorption liquid 14 are brought into contact with each other. This enables the $CO_2$ absorption liquid 14 to absorb to $CO_2$ in the exhaust gas 11.

Additionally, the $CO_2$ absorption tower 15 has a washing section 42 and a demister 43 on an upper side of the gas-liquid contactor 100. A $CO_2$-removed exhaust gas 41 from which $CO_2$ has been removed is released out of the system from a tower top part after the $CO_2$ absorption liquid 14 entrained in the $CO_2$-removed exhaust gas 41 is removed in the washing section 42 and the demister 43. In the gas-liquid contactor 100, a rich solution 16 that has absorbed $CO_2$ in the exhaust gas 11 is stored in a bottom part of the $CO_2$ absorption tower 15. The rich solution 16 stored in the bottom part of the $CO_2$ absorption tower 15 is pumped by a rich solution discharge pump 44 provided outside from the tower bottom part of the $CO_2$ absorption tower 15. The rich solution 16 is supplied into, the regeneration tower 17 from its tower top part after heat exchange is performed with the $CO_2$ absorption liquid 14, which has been regenerated in the regeneration tower 17, in a rich/lean solution heat exchanger 45.

The regeneration tower 17 releases $CO_2$ from the rich solution 16 to regenerate the rich solution as a lean solution 14. The rich solution 16 released into the regeneration tower 17 from the tower top part has most of $CO_2$ released therefrom by absorption of heat, and becomes a $CO_2$ absorption liquid (lean solution) 14 from which most of $CO_2$ has been removed in a tower bottom part of the regeneration tower 17. The lean solution 14 stored in the bottom part of the regeneration tower 17 is supplied to the $CO_2$ absorption tower 15 as a $CO_2$ absorption liquid after being supplied by a lean solvent pump 46 and being heat-exchanged with and cooled by the cooling water 48 by a lean solvent cooler 47. Meanwhile, a $CO_2$ gas 51 that has entrained steam is released from the tower top part of the regeneration tower 17. The $CO_2$ gas 51 that has entrained steam is delivered from the tower top part of the regeneration tower 17, the steam contained in the $CO_2$ gas 51 is condensed with cooling water 53 by a condenser 52, water. 56 is separated by a separation drum 54, and then, a $CO_2$ gas 55 is released out of the system and is recovered. Additionally, the water 56 separated by the separation drum 54 is supplied to the upper part, of the regeneration tower 17 by a condensed water circulation pump 57.

Figure 2:
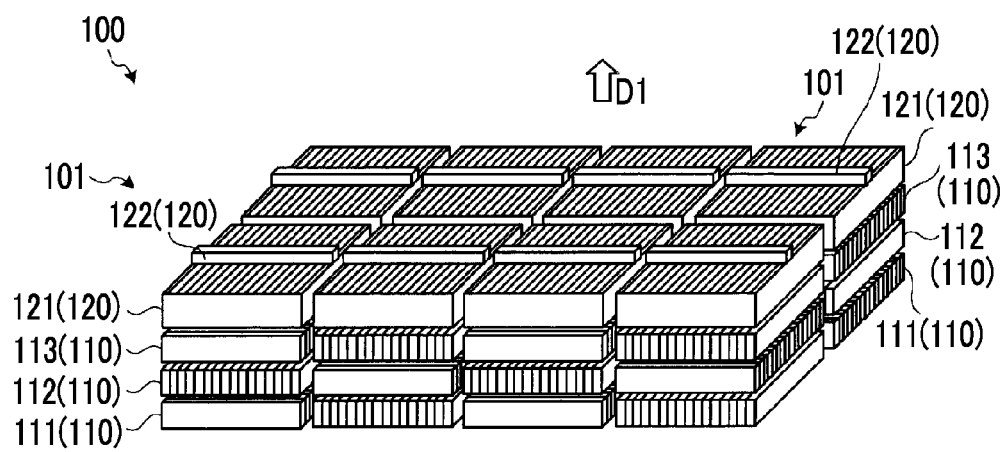
FIG. 2 is a schematic perspective view of the internal structure of the gas-liquid contactor related to the first embodiment.

Next, the internal structure of the gas-liquid contactor 100 related to the present embodiment will be described in detail. FIG. 2 is a schematic perspective view of the internal structure of the gas-liquid contactor 100 related to the present embodiment.

As illustrated in FIG. 2, a plurality of (eight in the present embodiment) units 101 each having the packing material section 110 through which the exhaust gas 11 passes, and the liquid distributor 120 provided on the packing material section 110 are arranged side by side inside the gas-liquid contactor 100 related to the present embodiment. The packing material section 110 has a substantially rectangular parallelepiped shape, and has a first packing material layer 111, a second packing material layer 112, and a third packing material layer 113 laminated in this order, respectively, such that these packing material layers come into contact, with each other in a flow direction of the exhaust gas 11.

The liquid distributor 120 is arranged above the third packing material layer 113 so as to be located on the subsequent stage side of the exhaust gas 11 in a flow direction D1 with respect to the packing material section 110. The liquid distributor 120 has a substantially rectangular parallelepiped shape, and includes a liquid distributor body 121 that has a flowpath 121a (not illustrated in FIG. 2, refer to FIG. 3) for the $CO_2$ absorption liquid 14 provided in the surface thereof, and a liquid supply section 122 for the $CO_2$ absorption liquid 14 provided in an upper surface of the liquid distributor body 121. In this way, in the present embodiment, a single packing material section 110 and a single liquid distributor 120 do not constitute a gas-liquid contactor, but a plurality of the units 101 each having a plurality of the packing material sections 110 and a plurality of the liquid distributors 120 are provided side by side. Accordingly, the gas-liquid contactor 100 can prevent the liquid maldistribution of the $CO_2$ absorption liquid 14 in the liquid distributor 120 and can prevent an increase in gas-liquid maldistribution to the packing material sections 110 of the units 101 adjacent to each other, even in a case where the overall device has increased in size.

Figure 3:
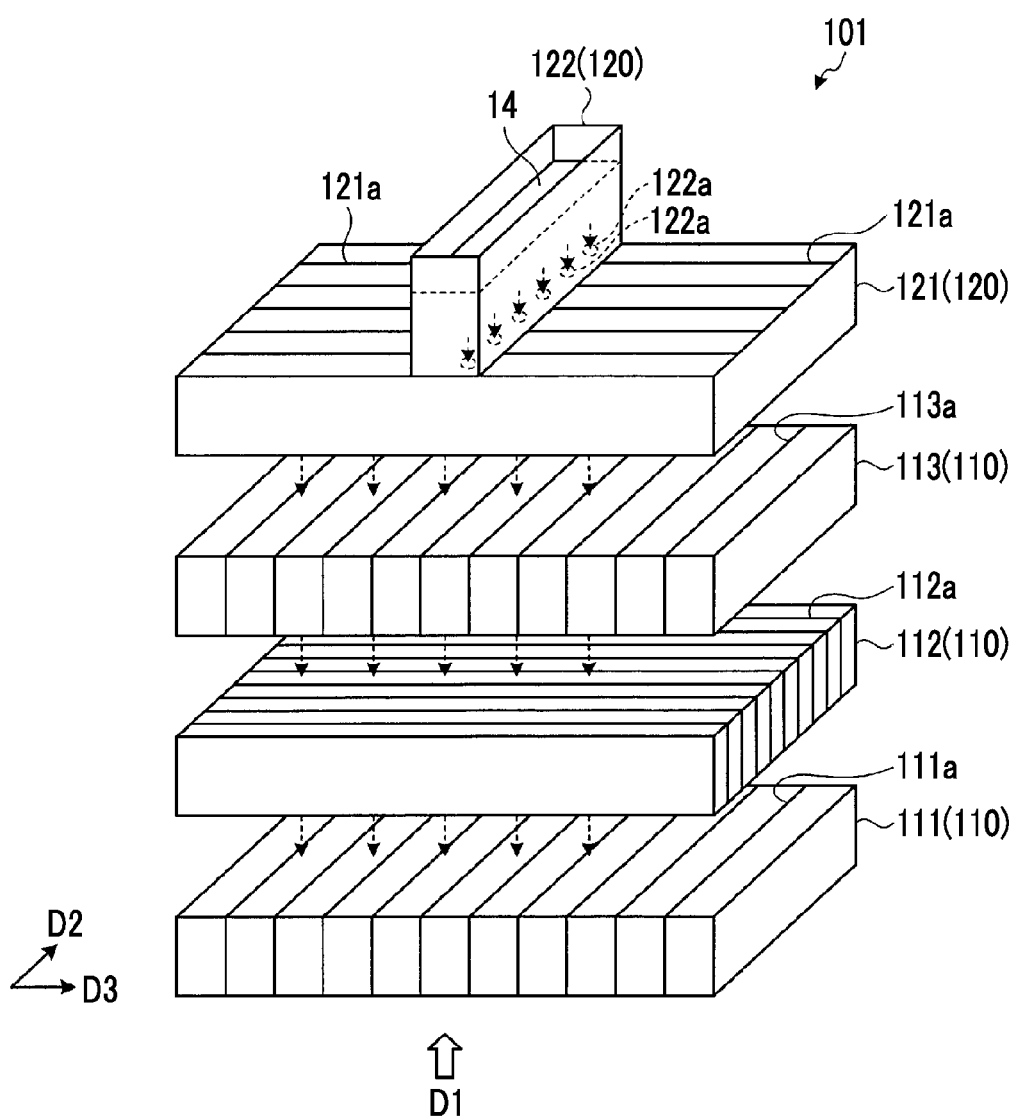
FIG. 3 is a schematic perspective view of units in the gas-liquid contactor related to the first embodiment.

FIG. 3 is a schematic perspective view of a unit 101 in the gas-liquid contactor 100 related to the present embodiment. In addition, for convenience of description, FIG. 3 illustrates that the first packing material layer 111, the second packing material layer 112, and the third packing material layer 113 are spaced apart from each other. As illustrated in FIG. 3, the liquid supply section 122 of the liquid distributor 120 has a substantially rectangular parallelepiped shape, and is provided at a central part of the liquid distributor 120. The liquid supply section 122 is open at its upper end, and is configured so as to be capable of supplying the $CO_2$ absorption liquid 14 thereinto from above. A bottom surface of the liquid supply section 122 is provided with a plurality of liquid supply ports 122a.

The liquid distributor body 121 has a substantially rectangular parallelepiped shape, and a plurality of the flowpaths 121a for the $CO_2$ absorption liquid 14 are provided substantially parallel to a direction substantially orthogonal to the flow direction D1 of the exhaust gas 11. By adopting such a configuration, the $CO_2$ absorption liquid 14 supplied into the liquid supply section 122 is dispersed via the flowpaths 121a of the liquid distributor body 121 from the liquid supply ports 122a, and is dispersed and supplied from a lower surface side of the liquid distributor 120 to the packing material section 110 arranged below the liquid distributor 120.

The first packing material layer 111, the second packing material layer 112, and the third packing material layer 113 of the packing material section 110 are respectively constituted as substantially rectangular parallelepiped plate-like members. The first packing material layer 111, the second packing material layer 112, and the third packing material layer 113 are respectively configured such that a plurality of flat plate-like members are laminated, and flowpaths 111a, 112a, and 113a for the $CO_2$ absorption liquid 14 are provided in gaps between the respective plate-like members. The first packing material layer 111, the second packing material layer 112, and the third packing material layer 113 are respectively provided with the flowpaths 111a to 113a through which the $CO_2$ absorption liquid 14 flows. By virtue of such a configuration, in the gas-liquid contactor 100, the dispersibility of the $CO_2$ absorption liquid 14 within the first packing material layer 111, the second packing material layer 112, and the third packing material layer 113 improves. Thus, gas-liquid maldistribution within the plurality of packing material sections 110 can be prevented.

The first packing material layer 111 and the second packing material layer 112 are laminated such that an extending direction D2 of the flowpaths 111a of the first packing material layer 111 and an extending direction D3 of the flowpaths 112a of the second packing material layer 112 become mutually different directions. Additionally, the second packing material layer 112 and the third packing material layer 113 are arranged such that the extending direction D3 of the flowpaths 112a of the second packing material layer 112 and the extending direction D2 of the flowpaths 113a of the third packing material layer 113 become different directions, respectively. In the present embodiment, the first packing material layer 111 and the second packing material layer 112 are laminated such that the extending direction D2 of the flowpaths 111a of the first packing material layer 111 and the extending direction D3 of the flowpaths 112a of the second packing material layer 112 are substantially orthogonal to each other. Additionally, the second packing material layer 112 and the third packing material layer 113 are arranged such that the extending direction D3 of the flowpaths 112a of the second packing material layer 112 and the extending direction D2 of the flowpaths 113a of the third packing material layer 113 are substantially orthogonal to each other. That is, the first packing material layer 111, the second packing material layer 112, and the third packing material layer 113 are arranged such that the extending directions D2 of the flowpaths 111a and 113a of the first packing material layer 111 and the third packing material layer 113 substantially coincide with each other. The extending direction D3 of the flowpaths of the second packing material layer 112 arranged between the first packing material layer 111 and the third packing material layer 113 is arranged so as to be substantially orthogonal to the extending directions D2 of the flowpaths 111a and 113a of the first packing material layer 111 and the third packing material layer 113.

By configuring the packing material sections 110 in this way, the $CO_2$ absorption liquid 14 that has been dispersed by the liquid distributor 120 and has flowed down to the third packing material layer 113 is dispersed in the extending direction D2 by the flowpaths 113a of the third packing material layer 113 and flows down to the second packing material layer 112. The $CO_2$ absorption liquid 14 that has flowed down to the second packing material layer 112 is dispersed in the extending direction D3 of the flowpaths 112a of the second packing material layer 112, and flows down to the first packing material layer 111. Then, the $CO_2$ absorption liquid 14 that has flowed down to the first packing material layer 111 is dispersed in the extending direction D2 of the flowpaths 111a of the first packing material layer 111, becomes the rich solution 16, and is stored in the lower part of the $CO_2$ absorption tower 15. Accordingly, since the $CO_2$ absorption liquid 14 flows down through the packing material sections 110 while being dispersed in mutually different directions, liquid maldistribution in the liquid distributor can be prevented even in a case where the overall device has increased in size.

As described above, according to the present embodiment, the $CO_2$ absorption liquid 14 dispersed by the liquid distributors 120 that are respectively provided in the plurality of packing material sections 110 is supplied. Thus, liquid maldistribution in the liquid distributors 120 can be prevented even in a case where the overall device has increased in size. Additionally, since the first packing material layer 111, the second packing material layer 112, and the third packing material layer 113 are laminated such that the extending directions D2 and D3 of the flowpaths 111a to 113a for the $CO_2$ absorption liquid 14 dispersed by the liquid distributors 120 are different from each other, gas-liquid maldistribution within the plurality of packing material sections 110 can be prevented. Moreover, since the plurality of packing material sections 110 are provided within the device, an increase in gas-liquid maldistribution to the packing material sections 110 adjacent to each other can be prevented. Therefore, in the gas-liquid contactor 100, it is possible to realize the gas-liquid contactor 100 that can reduce gas-liquid maldistribution within the device to prevent degradation in gas absorption performance, in a case where the overall device has increased in size.

Additionally, according to the above embodiment, the extending directions D2 and D3 of the flowpaths 111a to 113a are laminated so as to be substantially orthogonal to each other. Thus, the dispersibility of a liquid within the first packing material layer 111, the second packing material layer 112, and the third packing material layer 113 can be improved, and gas-liquid maldistribution within the plurality of packing material sections 110 can be prevented further.

In addition, an example in which three layers including the first packing material layer 111, the second packing material layer 112, and the third packing material layer 113 are laminated to constitute the packing material section 110 has been described in the above embodiment. However, the invention is not limited to this configuration. It is sufficient if the packing material section 110 is configured such that at least two layers are laminated.

Additionally, an example in which the $CO_2$ absorption liquid 14 is dispersed using a so-called trough type liquid distributor 120 has been described in the above embodiment. However, the invention is not limited to this configuration. If the liquid distributor 120 can disperse the $CO_2$ absorption liquid 14 to supply the $CO_2$ absorption liquid 14 to the packing material section 110, the liquid distributor is not limited particularly.

Additionally, although a case where the gas-liquid contactor 100 related to the present embodiment is used for the $CO_2$ absorption tower 15 of the $CO_2$ recovery device 10 has been described, the present embodiment is not limited to this, and may be used for the cooling tower 13 or the like.

Second Embodiment

Next, a second embodiment of the invention will be described. In addition, constituent elements common to those of the gas-liquid contactor 100 related to the above-described first embodiment will be designated by the same reference signs, and duplicate description thereof will be avoided.

Figure 4:
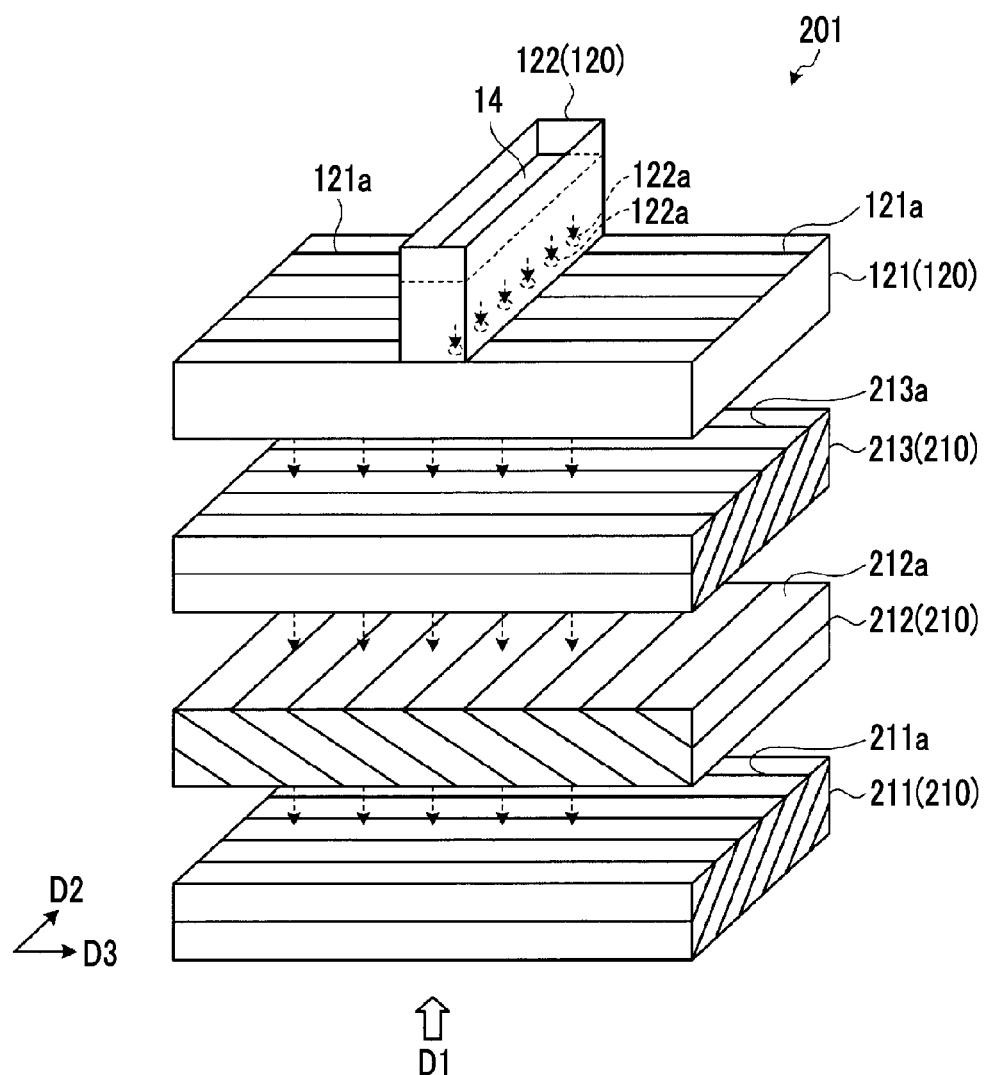
FIG. 4 is a schematic perspective view of units in a gas-liquid contactor related to a second embodiment.

FIG. 4 is a schematic perspective view of a unit 201 in the gas-liquid contactor 100 related to the present embodiment. In addition, for convenience of description, FIG. 4 illustrates that a first packing material layer 211, a second packing material layer 212, and a third packing material layer 213 are spaced apart from each other. As illustrated in FIG. 4, in the present embodiment, a packing material section 210 is arranged below the liquid distributor 120. The packing material section 210 is configured such that the first packing material layer 211, the second packing material layer 212, and the third packing material layer 213 are laminated. The first packing material layer 211, the second packing material layer 212, and the third packing material layer 213 of the packing material section 210 are respectively constituted as substantially rectangular parallelepiped plate-like members. The first packing material layer 211, the second packing material layer 212, and the third packing material layer 213 are respectively configured such that a plurality of plate-like members are laminated obliquely, and flowpaths 211a, 212a, and 213a for the $CO_2$ absorption liquid 14 are provided between the respective plate-like members. That is, in the present embodiment, the flowpaths 211a, 212a, and 213a for the $CO_2$ absorption liquid 14 are obliquely provided with respect to the flow direction D1 of the exhaust gas 11. Since the other configuration is the same configuration as the gas-liquid contactor 100 related to the above-described first embodiment, the description thereof will be omitted.

According to the present embodiment, the residence time of the $CO_2$ absorption liquid 14 within the packing material section 210 becomes long. Thus, the dispersibility of the $CO_2$ absorption liquid 14 can be improved, and gas-liquid maldistribution within the packing material section 210 can be prevented further.

Third Embodiment

Figure 5:
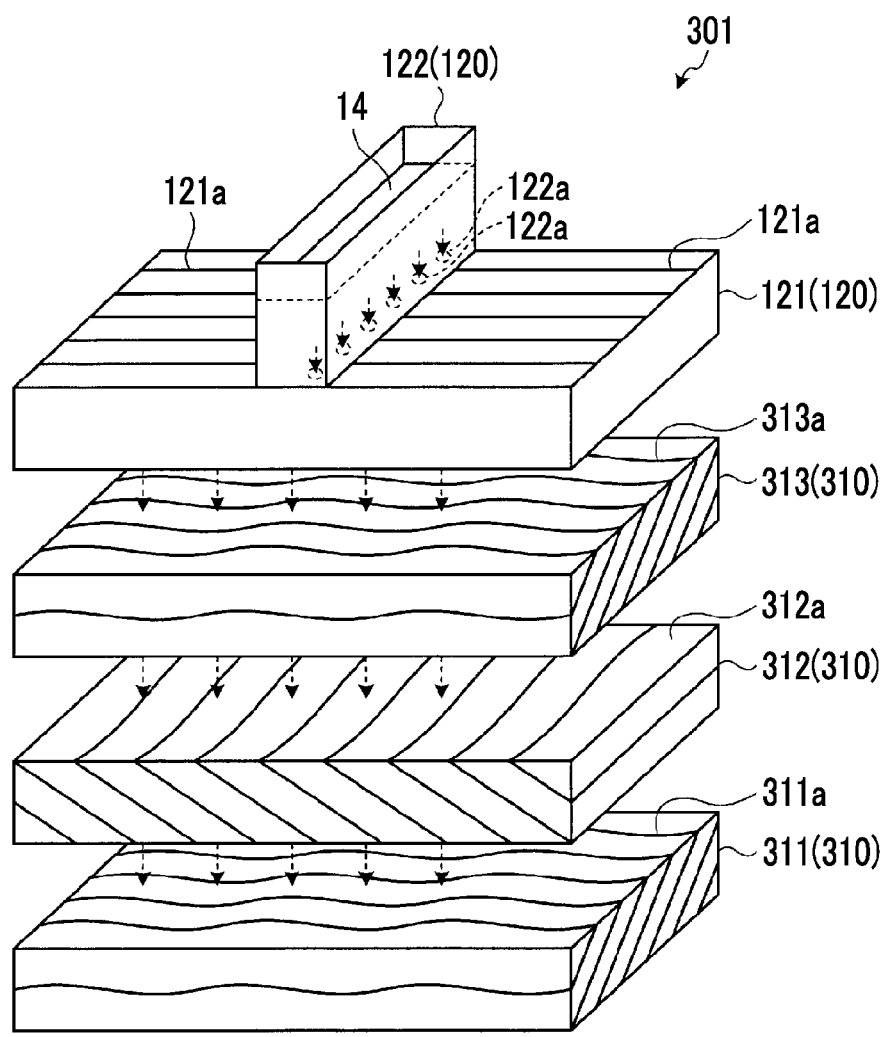
FIG. 5 is a schematic perspective view of units in a gas-liquid contactor related to a third embodiment.

FIG. 5 is a schematic perspective view of a unit 301 in the gas-liquid contactor 100 related to a third embodiment of the invention. In addition, for convenience of description. FIG. 5 illustrates that a first packing material layer 311, a second packing material layer 312, and a third packing material layer 313 are spaced apart, from each other. As illustrated in FIG. 5, in the present embodiment, a packing material section 310 is arranged below the liquid distributor 120. The packing material section 310 is configured such that the first packing material layer 311, the second packing material layer 312, and the third packing material layer 313 are laminated. The first packing material layer 311, the second packing material layer 312, and the third packing material layer 313 of the packing material section 310 are respectively constituted as substantially rectangular parallelepiped plate-like members. The first packing material layer 311, the second packing material layer 312, and the third packing material layer 313 are respectively configured such that a plurality of corrugated plate-like members are laminated obliquely, and flowpaths 311a, 312a, and 313a for the $CO_2$ absorption liquid 14 are provided between the respective plate-like members. That is, in the present embodiment, the flowpaths 311a, 312a, and 313a for the $CO_2$ absorption liquid 14 are provided in a wave fashion with respect to the extending directions D2 and D3 of the flowpaths 311a, 312a, and 313a of the exhaust gas 11. Since the other configuration is the same configuration as the gas-liquid contactor 100 related to the above-described first embodiment, the description thereof will be omitted.

According to the present embodiment, the residence time of the $CO_2$ absorption liquid 14 within the packing material section 310 becomes long. Thus, the dispersibility of the $CO_2$ absorption liquid 14 can be improved, and gas-liquid maldistribution within the packing material section 310 can be prevented further.

Fourth Embodiment

Figure 6:
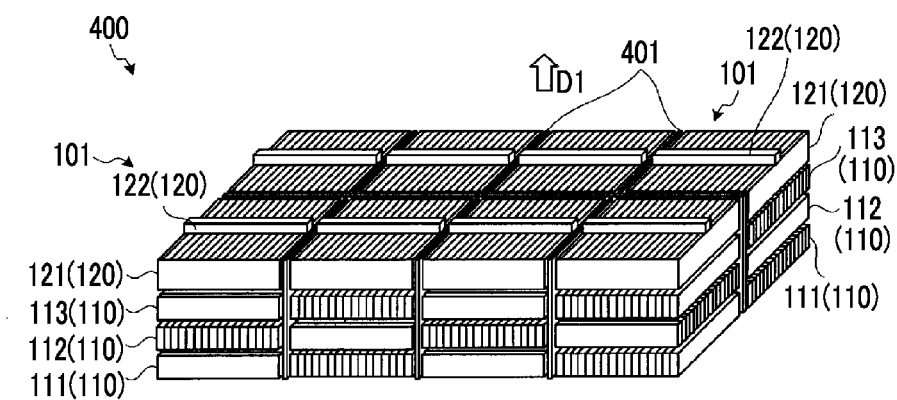
FIG. 6 is a schematic perspective view of a gas-liquid contactor related to a fourth embodiment.

FIG. 6 is a schematic perspective view of a gas-liquid contactor 400 related to a fourth embodiment of the invention. As illustrated in FIG. 6, a plurality of (eight in the present embodiment) units 101 each having the packing material section 110 through which the exhaust gas 11 passes, and the liquid distributor 120 provided on the packing material section 110 are arranged side by side inside the gas-liquid contactor 400 related to the present embodiment. Partitioning members 401 that partition off the respective units 101 from each other are provided between the respective units 101. Since the other configuration is the same configuration as the gas-liquid contactor 100 related to the above-described first embodiment, the description thereof will be omitted.

According to the present embodiment, the plurality of packing material sections 110 are divided by the partitioning members 401. Thus, an increase in gas-liquid maldistribution to the packing material layers adjacent to each other can be prevented further. In addition, in the example illustrated in FIG. 6, an example in which flat plate-like partitioning members 401 are arranged has been described. However, the shape of the partitioning members 401 are not necessarily a flat plate shape if the partitioning members can partition off the respective units 101 from each other.

Examples

Figure 7:
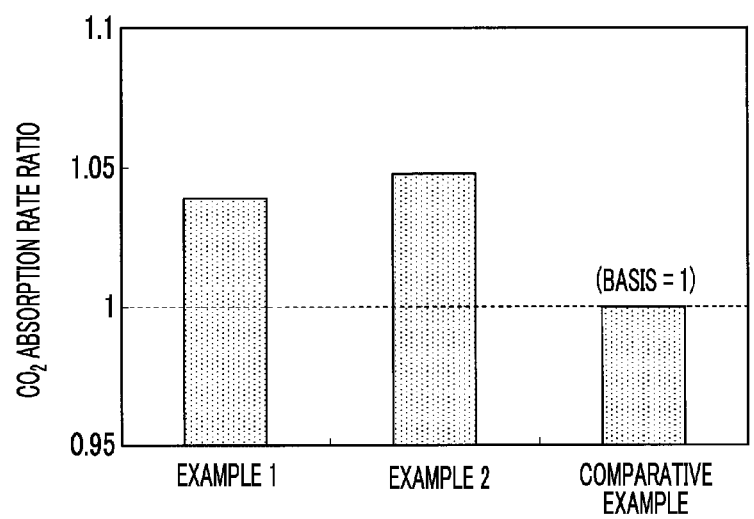
FIG. 7 is a view illustrating results of Example and Comparative Example.

Next, examples that are implemented in order to clarify the effects of the invention will, be described. The present inventors evaluated $CO_2$ absorption rate ratios on the basis of a related-art gas-liquid contactor (Comparative Example) about the gas-liquid contactor 100 (Example 1) related to the above-described first embodiment and the gas-liquid contactor 400 (Example 2) related to the fourth embodiment. The results are shown in FIG. 7. As illustrated in FIG. 7, the gas-liquid contactor 100 related to the above first embodiment in which the plurality of units 101 each including the packing material, section 110 and the liquid distributor 120 are provided shows a $CO_2$ absorption rate ratio of about 1.04 times greater than that of the related-art gas-liquid contactor. It is considered that this result is obtained because increases in liquid maldistribution in the liquid distributor 120, gas-liquid maldistribution within the plurality of packing material sections 110, and gas-liquid maldistribution to the packing material sections 110 adjacent to each other can be prevented. Additionally, the gas-liquid contactor 400 related to the above fourth embodiment in which the partitioning members 401 are arranged between the plurality of units 101 show a $CO_2$ absorption rate ratio of about 1.05 times greater than that of the related-art gas-liquid contactor. It is considered that this result is obtained because the plurality of packing material sections 110 are divided by the partitioning members 401, and thus, an increase in gas-liquid maldistribution to the packing material sections 110 adjacent to each other can be prevented further.

REFERENCE SIGNS LIST

10: $CO_2$ RECOVERY DEVICE
11: EXHAUST GAS
12, 56: WATER
13: COOLING TOWER
14: $CO_2$ ABSORPTION LIQUID
15: $CO_2$ ABSORPTION TOWER
16: RICH SOLUTION
17: REGENERATION TOWER
18, 48, 53: COOLING WATER
19: FLUE
20: SUPPLY PORT
41: $CO_2$-REMOVED EXHAUST GAS
42: WASHING SECTION
43: DEMISTER
44: RICH SOLUTION DISCHARGE PUMP
45: RICH/LEAN SOLUTION HEAT EXCHANGER
46: LEAN SOLVENT POMP
47: LEAN SOLVENT COOLER
51, 55: $CO_2$ GAS
52: CONDENSER
54: SEPARATION DRUM
57: CONDENSED WATER CIRCULATION POMP
100, 400: GAS-LIQUID CONTACTOR 101, 201, 301: UNIT
110, 210, 310: PACKING MATERIAL SECTION
111, 211, 311: FIRST PACKING MATERIAL LAYER
111a, 211a, 311a: FLOWPATH
112, 212, 312: SECOND PACKING MATERIAL LAYER
112a, 212a, 312a: FLOWPATH
113, 213, 313: THIRD PACKING MATERIAL LAYER
113a, 213a, 313a: FLOWPATH
120: LIQUID DISTRIBUTOR
121: LIQUID DISTRIBUTOR BODY
121a: FLOWPATH
122: LIQUID SUPPLY SECTION
122a: LIQUID SUPPLY PORT
401: PARTITION

The invention claimed is:

1. A gas-liquid contactor comprising:
a plurality of units that are arranged side by side inside the gas-liquid contactor; each unit having a packing material section through which a gas to be treated passes and a liquid distributor provided on the packing material section; the packing material section having a substantially rectangular parallelepiped shape;
wherein each liquid distributor respectively includes:
a liquid distributor body having a substantially rectangular parallelepiped shape and a plurality of flowpaths for liquid provided substantially parallel to a direction substantially orthogonal to the gas flow direction; and
a liquid supply section having a substantially rectangular parallelepiped shape and a bottom surface provided with a plurality of liquid supply ports, being provided at a central part of the liquid distributor on an upper surface of the liquid distributor body,
the liquid distributor being configured so that the liquid supplied into the liquid supply section can be dispersed via the flowpaths of the liquid distributor body from the liquid supply ports, and can be dispersed and supplied from a lower surface side of the liquid distributor to the packing material section arranged below the liquid distributor,
wherein each packing material section respectively includes a first packing material layer and a second packing material layer respectively constituted as substantially rectangular parallelepiped plate-like members that have flowpaths for the liquid provided in gaps between the respective plate-like members, and
wherein the first packing material layer and the second packing material layer are laminated in this order in the gas flow direction such that an extending direction of the flowpaths of the first packing material layer and an extending direction of the flowpaths of the second packing material layer are different from each other.

2. The gas-liquid contactor according to claim 1, wherein the first packing material layer and the second packing material layer are laminated such that the extending directions of the flowpaths are substantially orthogonal to each other.

3. The gas-liquid contactor according to claim 1, wherein the first packing material layer and the second packing material layer are provided such that packing materials therein are obliquely stacked with respect to a direction in which the packing material layers are stacked.

4. The gas-liquid contactor according to claim 1, further comprising:
partitioning members that are provided between the plurality of packing material sections and partition off the plurality of packing material sections from each other.

5. A $CO_2$ recovery device comprising:
a CO2 absorption tower including the gas-liquid contactor according to claim 1;
which brings an exhaust gas including $CO_2$ into contact with a $CO_2$ absorption liquid absorbing $CO_2$, and removes $CO_2$ from the exhaust gas; and
a regeneration tower that releases $CO_2$ from the $CO_2$ absorption liquid that has absorbed $CO_2$, and regenerates the $CO_2$ absorption liquid.

6. The gas-liquid contactor according to claim 1, wherein the first packing material layer and the second packing material layer are packing materials having substantially rectangular parallelepiped shapes.

7. The gas-liquid contactor according to claim 6, wherein the packing materials are corrugated or flat.

* * * * *